US012810504B2

(12) United States Patent
Eom

(10) Patent No.: US 12,810,504 B2
(45) Date of Patent: Nov. 24, 2026

(54) METHOD AND DEVICE FOR PROVIDING CLUB PATH IMAGE

(71) Applicant: Vieworks Co., Ltd., Anyang-si (KR)

(72) Inventor: Jae-Seong Eom, Ansan-si (KR)

(73) Assignee: Vieworks Co., Ltd., Anyang-si (KR)

( * ) Notice: Subject to any disclaimer, the term of this patent is extended or adjusted under 35 U.S.C. 154(b) by 224 days.

(21) Appl. No.: 18/790,026

(22) Filed: Jul. 31, 2024

(65) Prior Publication Data

US 2025/0050166 A1 Feb. 13, 2025

(30) Foreign Application Priority Data

Aug. 7, 2023 (KR) ........................ 10-2023-0102871

(51) Int. Cl.

| | |
|---|---|
| ***G06K 9/00*** | (2022.01) |
| ***A63B 24/00*** | (2006.01) |
| ***G06T 11/60*** | (2006.01) |
| *A63B 102/32* | (2015.01) |

(52) U.S. Cl.

CPC .......... *G06T 11/60* (2013.01); *A63B 24/0003* (2013.01); *A63B 2024/0028* (2013.01); *A63B 2102/32* (2015.10); *A63B 2220/05* (2013.01); *A63B 2220/807* (2013.01)

(58) Field of Classification Search

CPC .................. A63B 24/0003; G06T 7/11; G06T 2207/30241; G06V 10/16; G06V 10/25

See application file for complete search history.

(56) References Cited

U.S. PATENT DOCUMENTS

| | | | | | |
|---|---|---|---|---|---|
| 8,824,787 | B2 * | 9/2014 | Ueda | G06T 7/162 | 382/242 |
| 2005/0215336 | A1 * | 9/2005 | Ueda | A63B 24/0003 | 473/131 |
| 2008/0287207 | A1 * | 11/2008 | Manwaring | A63B 69/3623 | 473/409 |
| 2009/0270204 | A1 * | 10/2009 | Saegusa | A63B 69/3614 | 473/409 |

(Continued)

FOREIGN PATENT DOCUMENTS

| | | | | |
|---|---|---|---|---|
| JP | 7148192 B1 | | 9/2022 | |
| KR | 101031384 B1 | * | 4/2011 | A63B 69/3658 |

(Continued)

OTHER PUBLICATIONS

GolfDB: A Video Database for Golf Swing Sequencing, William McNally et al., arXiv, 2019, pp. 1-10 (Year: 2019).*

(Continued)

*Primary Examiner* — Jayesh A Patel

(74) *Attorney, Agent, or Firm* — Bridgeway IP Law Group, PLLC; Jihun Kim

(57) ABSTRACT

Described are a method and a device for providing an image of a path of a club hitting a golf ball in a virtual golf simulation system. The device for providing a club path image includes: a camera control unit for controlling a camera sensor including a first camera acquiring image information of at least a portion of a golf mat; an image acquiring unit for acquiring an image photographed by the first camera; and a club path image generating unit for receiving an image of the first camera from the image acquiring unit and generating a club path image of a path of a golf club hitting a golf ball placed on the golf mat.

12 Claims, 7 Drawing Sheets

(56) References Cited

U.S. PATENT DOCUMENTS

| | | | | |
|---|---|---|---|---|
| 2014/0003666 | A1* | 1/2014 | Park | G09B 19/0038 382/103 |
| 2014/0177926 | A1* | 6/2014 | Nojima | G06T 7/246 382/107 |
| 2023/0414998 | A1* | 12/2023 | Ishikawa | A63B 24/0006 |
| 2025/0276213 | A1* | 9/2025 | Bae | G06T 7/73 |

FOREIGN PATENT DOCUMENTS

| | | | | | |
|---|---|---|---|---|---|
| KR | 10-1059325 | B1 | | 8/2011 | |
| KR | 10-1078975 | B1 | | 10/2011 | |
| KR | 10-1408118 | B1 | | 6/2014 | |
| KR | 10-2018-0084354 | A | | 7/2018 | |
| KR | 10-1982678 | B1 | | 5/2019 | |
| KR | 20210149478 | A | * | 12/2021 | A63B 1/0622 |
| KR | 20210155564 | A | * | 12/2021 | H04N 5/77 |
| KR | 102531041 | B1 | * | 5/2023 | G06F 17/16 |
| WO | WO-2017026664 | A1 | * | 2/2017 | G06T 7/00 |
| WO | WO-2021246662 | A1 | * | 12/2021 | G03B 21/56 |

OTHER PUBLICATIONS

Volker Scholz, “European Search Report for EP Application No. 24192328.3”, Nov. 20, 2024, EPO, Germany.

* cited by examiner

METHOD AND DEVICE FOR PROVIDING CLUB PATH IMAGE

CROSS-REFERENCE TO RELATED APPLICATIONS

This application claims priority to and the benefit of Korean Patent Application No. 10-2023-0102871 filed in the Korean Intellectual Property Office on Aug. 7, 2023, the entire contents of which are incorporated herein by reference.

TECHNICAL FIELD

The present invention relates to a method and a device for providing an image in a virtual golf simulation system. More particularly, the present invention relates to a method and a device for providing an image of a path of a club hitting a golf ball in a virtual golf simulation system.

BACKGROUND ART

With the interest in golf and the development of information and communication technology, virtual golf simulation systems, also known as screen golf, have become widely used. These virtual golf simulation systems are not only used to enjoy golf play in a virtual environment, but are also used to practice golf indoors.

When a player hits a golf ball with a golf club, the path of the head of the golf club relative to the golf ball before and after the golf ball is hit is a very important factor in determining the golf ball flight. For this purpose, there are virtual golf simulation systems that provide the player with the path of the head of the golf club before and after the golf ball is hit.

However, it is necessary to have a separate camera to photograph the head path of the golf club in order to provide the head path of the golf club to the user of the virtual golf simulation system. This causes the cost of the virtual golf simulation system to increase. Also, when a separate camera is not provided, the head path of the golf club is not effectively provided to the user.

PRIOR ART LITERATURE

Patent Document (Patent Document 1) Korean Patent No. 10-1078975

SUMMARY OF THE INVENTION

The present invention has been made in an effort to provide a method and a device for providing a club path image, which are capable of providing an image of a head path of a golf club without having a separate camera for photographing the head path of the golf club before and after a golf ball is hit.

An exemplary embodiment of the present invention provides a device for providing a club path image includes: a camera control unit for controlling a camera sensor including a first camera acquiring image information of at least a portion of a golf mat; an image acquiring unit for acquiring an image photographed by the first camera; and a club path image generating unit for receiving an image of the first camera from the image acquiring unit and generating a club path image of a path of a golf club hitting a golf ball placed on the golf mat.

In the exemplary embodiment, a region of interest of the first camera may be set to a first region of interest before the golf ball is hit by the golf club, and the first region of interest may be changed to a second region of interest after the golf ball is hit by the golf club.

Further, when the golf club is moved from a first side to a second side, the first region of interest is set such that the golf ball is located on the second side, and the second region of interest may be set such that the golf ball is located on the first side.

Further, the camera sensor may further include a second camera, and a region of interest of the second camera may be set to the second region of interest before and after the golf ball is hit by the golf club.

In the exemplary embodiment, the device may further include a main control unit controlling the camera control unit and the image acquiring unit, in which the main control unit may detect hit of the golf ball based on image information from the second camera.

In the exemplary embodiment, the main control unit may control the camera control unit to change the region of interest of the first camera from the first region of interest to the second region of interest when the hit of the golf ball is detected.

In the exemplary embodiment, the club path image generating unit may stitch image information (mat segmentation image) for a partial region of the golf mat to image information for the first region of interest and image information for the second region of interest from the first camera to extend the image along a direction of movement of the golf club.

Further, the mat segmentation image may be extracted from a region of the image of the golf mat included in a photographing region of the first camera, in which the golf ball is not located.

In the exemplary embodiment, the club path image generating unit may include: an image processing unit that receives image information of the first camera from the image acquiring unit and sequentially processes image information for the first region of interest and image information of the second region of interest; an image synthesizing unit for stitching the mat segmentation image to the image information for the first region of interest and the image information for the second region of interest; and an image storing unit for temporarily storing the image information from the image processing unit and the image synthesizing unit.

The club path image generating unit may stitch the mat segmentation image to a first side of image information for the first region of interest, and the mat segmentation image to a second side, opposite to the first side, of image information for the second region of interest.

Another exemplary embodiment of the present invention provides a method of providing a path image of a golf club hitting a golf ball placed on a golf mat by a club path image generating device, based on image information from a camera sensor including a first camera including the golf mat in a photographing region, the method including: (a) setting a region of interest of the first camera as a first region of interest; (b) acquiring a pre-hit image of the golf ball by the golf club in the first region of interest from the first camera; (c) stitching a mat segmentation image of a segmented portion of the golf mat to the pre-hit image to synthesize an extended pre-hit image; (d) changing a region of interest of the first camera to a second region of interest when the hit of the golf ball is detected; (e) acquiring a post-hit image of the golf ball by the golf club in the second region of interest from the first camera; (f) stitching the mat segmentation image to the post-hit image to synthesize an extended post-hit image; and (g) connecting the extended pre-hit image and the extended post-hit image.

In the exemplary embodiment, when the golf club is moved from a first side to a second side, the first region of interest may be set such that the golf ball is located on the second side, and the second region of interest may be set such that the golf ball is located on the first side.

Further, the camera sensor may further include a second camera, and a region of interest of the second camera may be set to the second region of interest before and after the golf ball is hit by the golf club.

Further, in the operation (c), the mat segmentation image may be stitched to a first side of the image information for the first region of interest, and in the operation (f), the mat segmentation image may be stitched to a second side, opposite to the first side, of image information for the second region of interest.

According to the present invention, it is possible to provide an image of a head path of a golf club without having a separate camera for photographing the head path of the golf club before and after a golf ball is hit. Accordingly, it is possible to effectively provide a user with an image of a path of the golf club without significantly increasing the complexity or cost of a virtual golf simulation system.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

Figure 1:
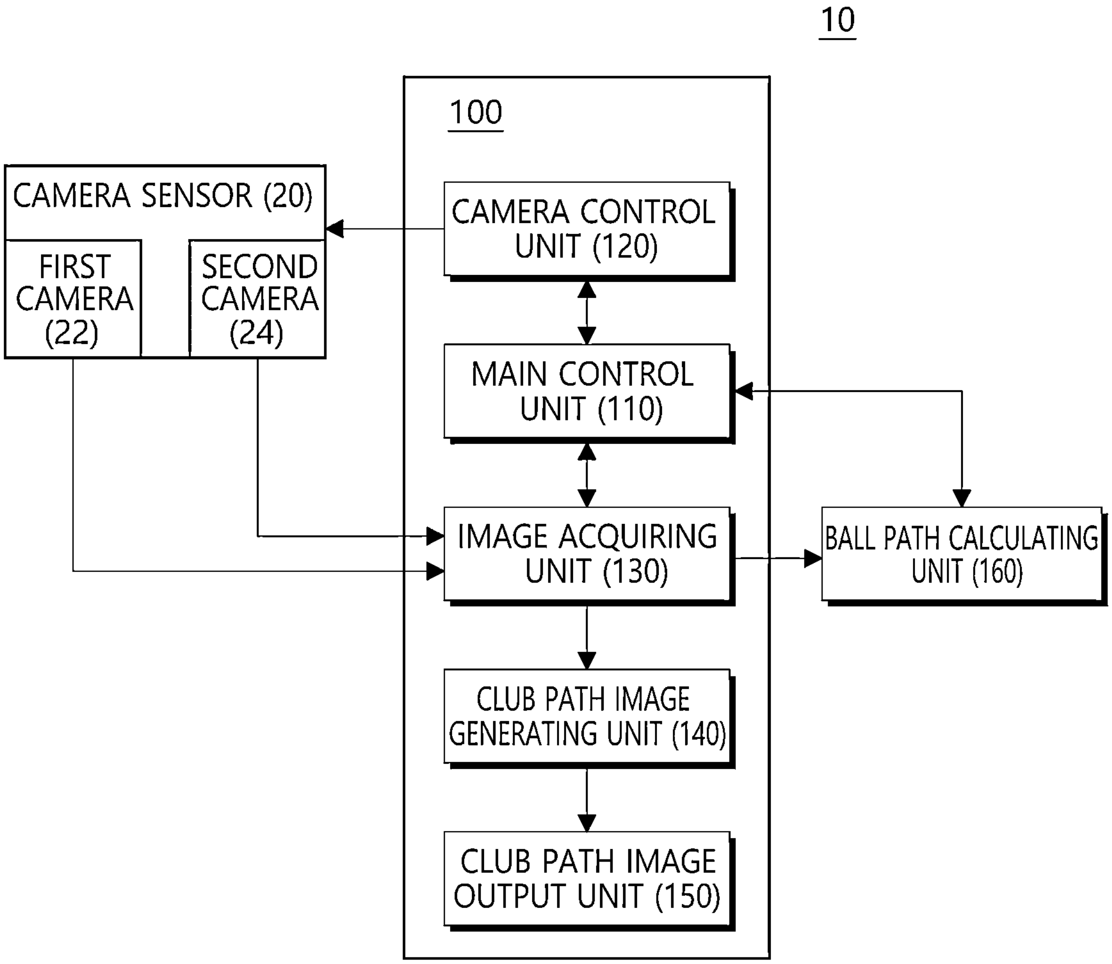
FIG. 1 is a block diagram illustrating a configuration of a virtual golf simulation system including a club path image providing device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are illustrated in different drawings. Further, in the following description of the present invention, a detailed description of known configurations or functions incorporated herein will be omitted when it is judged that the detailed description may make the subject matter of the present disclosure unclear. It should be understood that although the exemplary embodiment of the present invention is described hereafter, the spirit of the present invention is not limited thereto and the present invention may be changed and modified in various ways by those skilled in the art.

FIG. 1 is a block diagram illustrating a configuration of a virtual golf simulation system including a club path image providing device according to an exemplary embodiment of the present invention.

A virtual golf simulation system 10 includes a club path image providing device 100, a camera sensor 20 for photographing a region including at least a portion of a golf mat, and a ball path calculating unit 160 for calculating a path of a golf ball by using the image acquired from the camera sensor 20. In the exemplary embodiment, the club path image providing device 100 may provide the ball path calculating unit 160 with necessary image information. The virtual golf simulation system 10 may further include a projection device (not illustrated) for displaying a virtual golf course and a golf ball path. The projection device may include a screen and a projector, and various systems are known in the art for the basic virtual golf simulation system 10, so a description of other detailed configurations of the virtual golf simulation system 10 in the present invention will be omitted.

The club path image providing device 100 forms a part of the virtual golf simulation system 10 and provides a club path image including images of a golf club head hitting the golf ball and the golf ball. The club path image provided by the club path image providing device 100 may be provided to a user via the projection device. In the exemplary embodiment, the club path image may be presented via the projection device with an image displaying the path of the golf ball on a virtual golf course, or the club path image may be presented with information about the path of the golf ball (e.g., the speed of the golf ball at the hit, and the amount of spin of the golf ball).

The camera sensor 20 may include at least two cameras including a first camera 22 and a second camera 24. The first camera 22 and the second camera 24 may configure stereo cameras to acquire three-dimensional movement information of the golf ball.

To acquire the three-dimensional movement information of the golf ball in a stereo manner, the first camera 22 and the second camera 24 may simultaneously acquire images of a region including the golf ball after the hit of the golf ball is detected. The images including the golf ball acquired by the first camera 22 and the second camera 24 may be utilized for stereo matching, and the movement information of the golf ball may be calculated. In the exemplary embodiment, the images acquired by the first camera 22 and the second camera 24 may be transmitted to an image acquisition unit 130 of the club path image providing device 100 and then transmitted to a ball path calculating unit 160. The ball path calculating unit 160 may apply stereo matching to calculate the movement information of the golf ball and present the calculated movement information as information about a speed, movement path, and driving distance of the golf ball on the virtual golf course.

The club path image providing device 100 may include a main control unit 110, a camera control unit 120, the image acquiring unit 130, the club path image generating unit 140, and a club path image output unit 150.

The main control unit 110 controls the overall operation of the club path image providing device 100.

The camera control unit 120 controls the operation of the camera sensor 20. In the exemplary embodiment, the camera control unit 120 may control a region of interest (ROI) of the camera sensor 20. Basically, the first camera 22 and second camera 24 configuring the camera sensor 20 are fixedly mounted to a ceiling of a golf booth so as to include the golf mat on which the golf ball is placed in a photographing region. However, in order to accurately calculate the movement information of the golf ball according to the hit of the golf ball, it is necessary for the first camera 22 and the second camera 24 to perform high-speed photographing. Acquiring and processing all of the sensing information from the entire region of the image sensors provided in the first camera 22 and the second camera 24 may not be suitable for high-speed photographing. Accordingly, the camera control unit 120 may set the ROIs of the first camera 22 and the second camera 24 under the control of the main control unit 110.

The image acquiring unit 130 receives image information acquired from the first camera 22 and the second camera 24. In the exemplary embodiment, the image acquiring unit 130 may receive image information from the first camera 22 and the second camera 24 according to respective ROIs set in the camera control unit 120. In the implementation of the present invention, when the first camera 22 and the second camera 24 and the club path image providing device 100 have sufficient processing speed, the process of setting the ROI of each of the first and second cameras 22 and 24 by the camera control unit 120 may be omitted. In this case, it is also possible that the image information of the entire region acquired by the image sensors of the first camera 22 and the second camera 24 is transmitted to the image acquiring unit 130, and the image acquiring unit 130 extracts only the image information of the region corresponding to the region of interest for further processing. However, the ROI of the first and second cameras 22 and 24 is described herein as being set by the camera control unit 120.

In the implementation of the present invention, any one of the first camera 22 and the second camera 24 may be set to have the same ROI before the golf ball is hit by the golf club as the ROI immediately after the golf ball is hit to detect the hit of the golf ball by the golf club, and the other of the first camera 22 and the second camera 24 may be set to have a different ROI before the golf ball is hit from an ROI after the golf ball is hit. For convenience of description, in the following description, the second camera 24 is set to have the same ROI before the golf ball is hit as the ROI after the golf ball is hit, and the first camera 22 is set to have a different ROI before the golf ball is hit from an ROI immediately after the golf ball is hit. Further, the hit of the golf ball is detected from the image information of the second camera 24 in which the ROIs before the hit and the ROI after the hit are the same. However, in the implementation of the present invention, it is of course possible that the detection of the hit of the golf ball is performed from the image information of the first camera 22.

The club path image generating unit 140 generates a ball hit image (club path image) including a club path before and after the golf ball is hit by using the image of the first camera 22 in which the ROI before the golf ball is hit and the ROI immediately after the golf ball is hit are set differently.

The club path image output unit 150 outputs the club path image generated by the club path image generating unit 140 to the outside of the club path image providing device 100.

Figure 2:
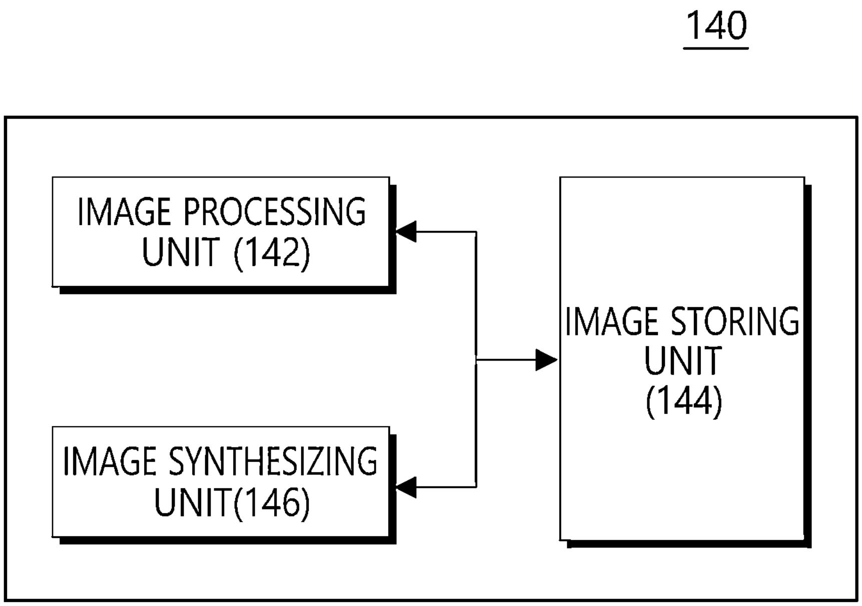
FIG. 2 is a block diagram illustrating a detailed configuration of a club path image generating unit of a club path image providing device according to the exemplary embodiment of the present invention.

FIG. 2 is a block diagram illustrating a detailed configuration of the club path image generating unit of the club path image providing device according to the exemplary embodiment of the present invention.

The club path image generating unit 140 may include an image processing unit 142, an image storing unit 144, and an image synthesizing unit 146.

The image processing unit 142 processes the images received from the camera sensor 20. In the exemplary embodiment of the present invention, the club path image may be generated by using only the image from the first camera 22. Accordingly, the image acquiring unit 130 may receive image information from the first camera 22 and the second camera 24, and then transmit only the image information from the first camera 22 to the image processing unit 142 of the club path image generating unit 140.

The image processing unit 142 processes the image information received from the first camera 22 so that the processed image information is temporarily stored in the image storing unit 144. In the exemplary embodiment, the image storing unit 144 may be configured as a buffer memory.

The image synthesizing unit 146 synthesizes a golf ball hit image including a path of a golf club hitting a golf ball, by using the image stored in the image storing unit 144. Each frame of the image synthesized by the image synthesizing unit 146 may be stored in the image storing unit 144.

Figure 3:
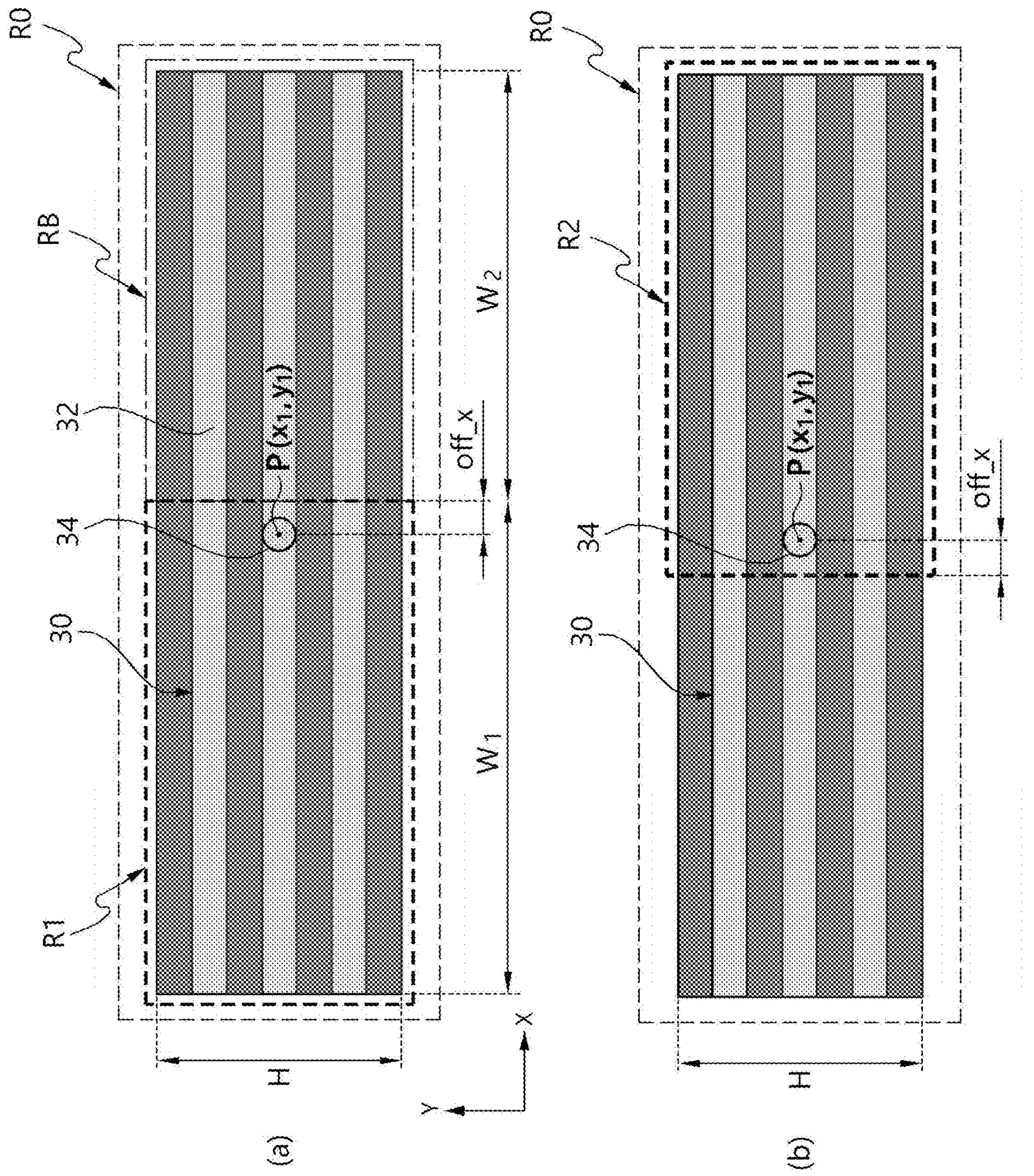
FIG. 3 is a diagram illustrating a region of interest of a camera sensor in the club path image providing device according to the exemplary embodiment of the present invention.

FIG. 3 is a diagram illustrating a region of interest of the camera sensor in the club path image providing device according to the exemplary embodiment of the present invention.

In FIG. 3, a golf ball 34 is illustrated placed on a golf mat 30. R0 indicates a photographing region which the first camera 22 and the second camera 24 are capable of photographing. When the golf ball 34 is placed on the golf mat 30, the main control unit 110 recognizes the golf ball 34 from an image acquired by the first camera 22 or the second camera 24. When the golf ball 34 is placed on the golf mat 30 and maintains in a stop state for a period of time, the main control unit 110 may control the club path image providing device 100 to be ready to recognize hit of the golf ball 34. In the exemplary embodiment, the main control unit 110 may present a ready signal indicating that the golf ball 34 is ready to be hit to the user by an audible or visual method.

Part (a) of FIG. 3 is a diagram for illustrating the ROI of the first camera 22 after the ready state is completed, and part (b) of FIG. 3 is a diagram for illustrating the ROI of the first camera 22 immediately after the hit of the golf ball 34 is detected. In FIG. 3, the golf club is assumed to hit the golf ball 34 while moving from left to right.

Referring to part (a) of FIG. 3, the camera control unit 120 sets a region including the golf ball 34 at the right end in the photographing region R0 as a first ROI R1 and sets the region of interest of the first camera 22 as a first region of interest R1. When it is assumed that the width of the golf mat 30 included in the first region of interest R1 is W1 and the height of the golf mat 30 is H (the coordinates of the lower left end of the first region of interest R1 are (0, 0)), and the position of the golf ball 34 is $P(x_1, y_1)$, W1 is "x1+Off_x". The X-axis offset value (Off_x) may be understood as a margin value to ensure that the golf ball 34 is placed on the right end side of R1. Meanwhile, an extra region of interest RB may be further set for a region 32 of the mat without the golf ball 34 in the photographing region R0. In part (a) of FIG. 3, the extra region of interest RB may be a region adjacent to the first region of interest R1 and having a width of W2.

The image information from the first camera 22 is continuously transmitted to the club path image generating unit 140 via the image acquiring unit 130.

Immediately after the main control unit 110 determines that the ready state is complete, the camera control unit 120 enables the first camera 22 to transmit the image information including the image information for the extra region of interest RB to the image acquiring unit 130. The image processing unit 142 extracts the information about the extra region of interest RB from the image information of the first camera 22 received from the image acquiring unit 130 and stores the extracted information in the image storing unit 144. However, in the implementation of the present invention, the image information of the extra region of interest RB is not stored after the ready state is complete, but it is also possible to store the image of the entire region of the golf mat in advance and utilize the stored image as the image information of the extra region of interest RB by dividing the image of the golf mat in consideration of the width of the first region of interest R1 and the width of the second region of interest R2.

The camera control unit 120 sets the ROI of the first camera 22 to the first region of interest R1. When the information about the extra region of interest RB is generated at the time of each hit of the golf ball, the ROI of the first camera 22 may be set to the first region of interest R1 after the information about the extra region of interest RB is stored after the ready state is complete. When the information about the extra region of interest RB is generated by utilizing the already stored image information of the golf mat, the region of interest of the first camera 22 may be set to the first region of interest R1 after the ready state is complete.

The image processing unit 142 sequentially stores the image information for the first region of interest R1 from the first camera 22 in the image storing unit 144. In the exemplary embodiment, the image processing unit 142 may cause the image information for the first region of interest R1 from the first camera 22 to be stored in the image storing unit 144 over time. The storage of the image information for the first region of interest R1 from the first camera 22 may be performed until the hit of the golf ball 34 is detected.

Meanwhile, the image synthesizing unit 146 generates a synthesized image by stitching the image information of the extra region of interest RB to the right side of the image information for the first region of interest R1 from the first camera 22. For example, when the frame rate of the club path image to be finally generated is 30 frames per second (fps), the image information from the first camera 22 for the first region of interest R1 is stored in the image storing unit 144 every 1/30 second, and the image synthesizing unit 146 may also synthesize the frames of the synthesized image by stitching the extra region of interest RB to the image information for the first region of interest R1 at 1/30 second intervals. In the exemplary embodiment, the image synthesizing unit 146 may perform processing on a boundary region such that when stitching the image information for the first region of interest R1 and the image information for the extra region of interest RB, the stitched image boundaries are smooth.

Referring to part (b) of FIG. 3, immediately after the hit of the golf ball 34 is detected, the region of interest of the first camera 22 is changed to a second region of interest R2. A starting position in the X-axis direction of the second region of interest R2 may be a position shifted by Off_x to the left side in the X-axis direction from the position (P(x1, y1)) of the golf ball 34 in the ready state. In the exemplary embodiment, the ROI of the second camera 24 may be fixed to the second region of interest R2 over time before and after the golf ball is hit. After the golf ball 34 is hit, the region of interest of the first camera 22 is changed to the second region of interest R2 identically to the second camera 24, so that the movement information of the golf ball 34 may be calculated in a stereo manner.

Meanwhile, the image processing unit 142 receives the image information from the first camera 22 in the second region of interest R2 and stores the received image information in the image storing unit 144.

The image synthesizing unit 146 generates a synthesized image by stitching already stored image information of the vacant golf mat (e.g., the image information of the extra region of interest RB) to the left side of the image information of the second region of interest R2 stored in the image storing unit 144. The synthesized image after the golf ball is hit may also be generated according to the frame rate of the club path image to be finally generated.

The image storing unit 144 stores images of the golf club and the golf ball before and after the golf ball is hit generated by the image synthesizing unit 146.

The club path image output unit 150 extracts and outputs the club path images corresponding to a predetermined time before and after the golf ball is hit based on the time of the hit of the golf ball. In the exemplary embodiment, the club path image output unit 150 may set an output range of the club path image, such as from −1 second to +1 second, or from −2 seconds to +2 seconds, based on the time of the hit of the golf ball. In addition, in the exemplary embodiment, a time when the golf club enters the first region of interest R1 and a time when the golf club leaves the second region of interest R2 are calculated according to the speed of the golf club (i.e., the club head speed), and the club path image output unit 150 may extract and output the club path image according to the time when the golf club enters the first region of interest R1 and leaves the second region of interest R2. The club path image output unit 150 may also be capable of providing the club path image as a slowed-down screen.

Figure 4:
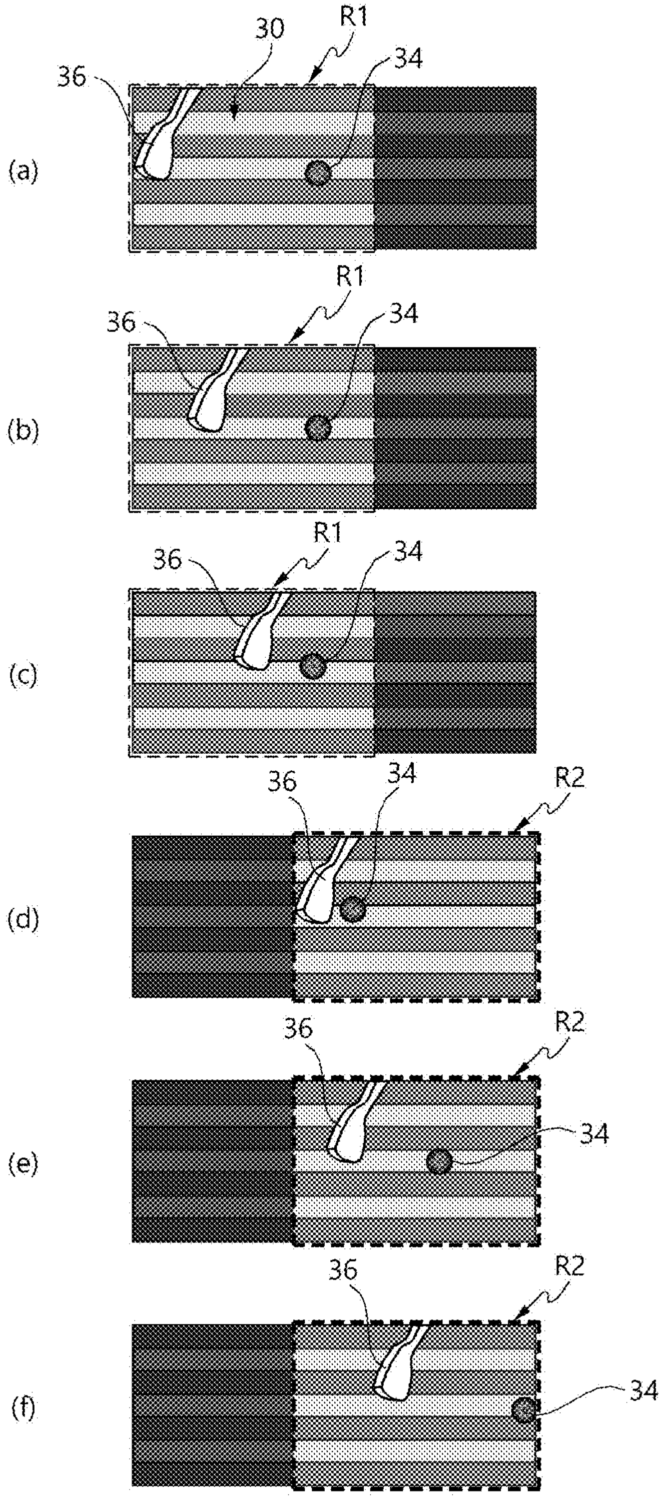
FIG. 4 is a diagram illustrating an example of images before and after a golf ball is hit according to a region of interest in the club path image providing device according to the exemplary embodiment of the present invention.

FIG. 4 is a diagram illustrating an example of images before and after a golf ball is hit according to a region of interest in the club path image providing device according to the exemplary embodiment of the present invention.

Part (a) to part (c) of FIG. 4 illustrate images before the golf ball is hit according to the first region of interest R1. Referring to part (a) to part (c) of FIG. 4, an image in the first region of interest R1 in which the golf club 36 sequentially approaches the golf ball 34 placed on the golf mat 30 is generated in the image processing unit 142 of the club path image generating unit 140.

Part (d) to part (f) of FIG. 4 illustrate images after the golf ball is hit according to the second region of interest R2.

Referring to part (d) to part (f) of FIG. 4, the golf ball 34 is hit by the golf club 36, and an image of the movement of the hit golf ball 34 and the golf club 36 is generated in the image processing unit 142 of the club path image generating unit 140.

Figure 5:
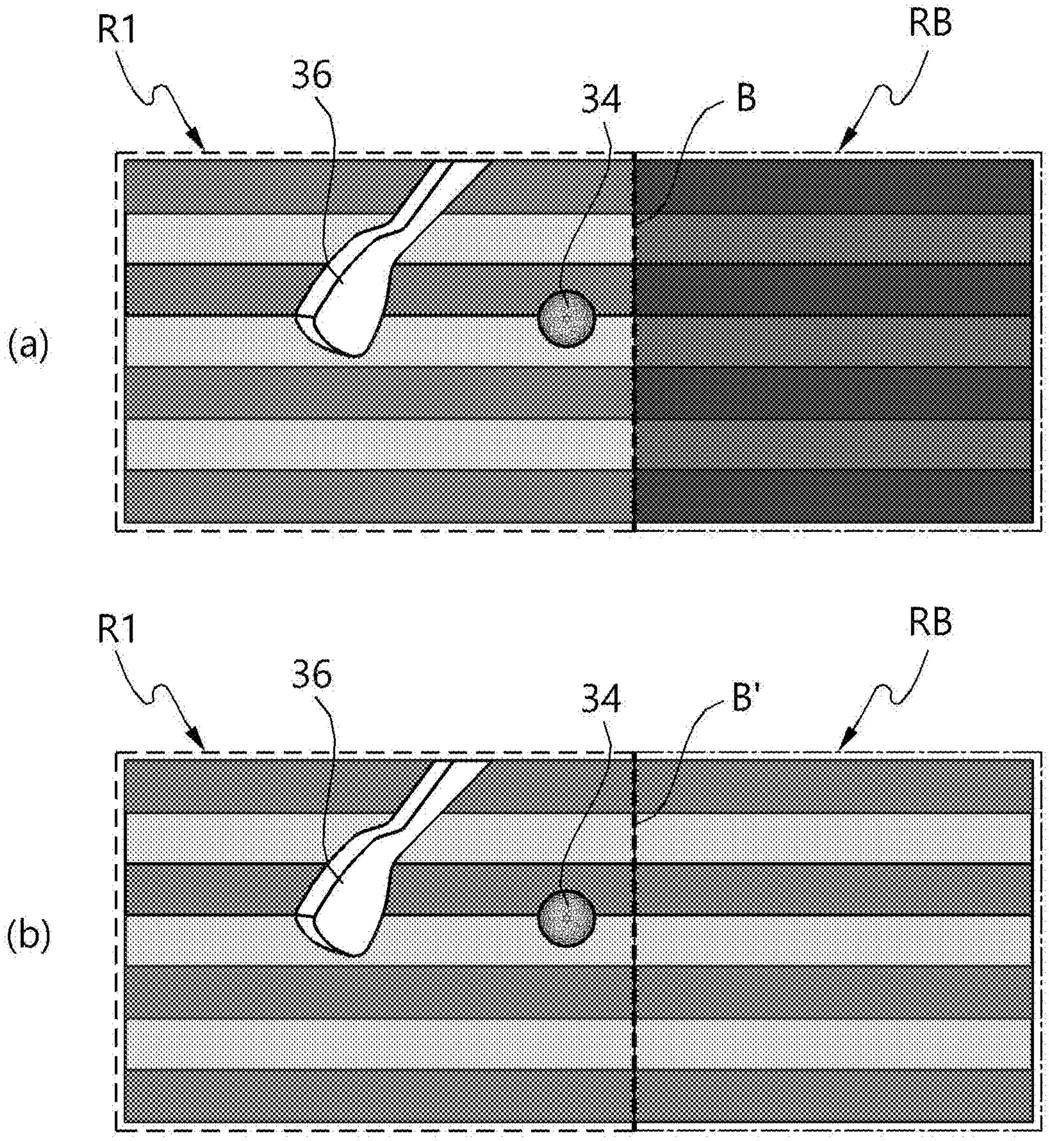
FIG. 5 is a diagram illustrating an example of synthesizing image information of an extra region of interest in the club path image providing device according to the exemplary embodiment of the present invention.

FIG. 5 is a diagram illustrating an example of synthesizing image information of an extra region of interest in the club path image providing device according to the exemplary embodiment of the present invention.

Referring to part (a) of FIG. 5, when the image information for the extra region of interest RB is stitched to the image information acquired in the first region of interest R1, the boundary portion B may be unnatural. The image synthesizing unit 146 processes the boundary portion B into a corrected boundary portion B', as illustrated in part (b) of FIG. 5, so that the synthesized image may be stitched naturally.

Figure 6:
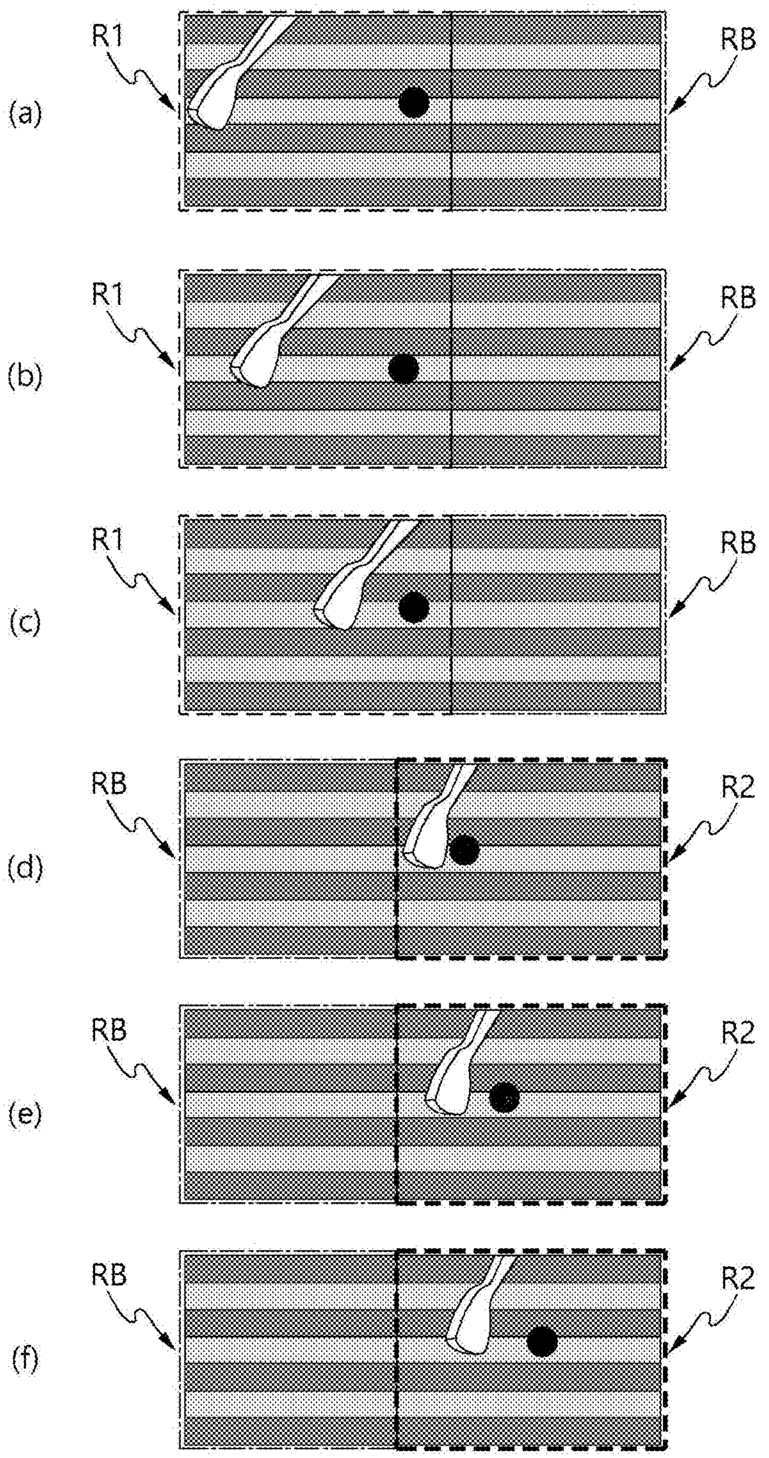
FIG. 6 is a diagram illustrating an example of a result of stitching the image information of the extra region of interest in the club path image providing device according to the exemplary embodiment of the present invention.

FIG. 6 is a diagram illustrating an example of a result of stitching the image information of the extra region of interest in the club path image providing device according to the exemplary embodiment of the present invention.

Referring to part (a) to part (c) of FIG. 6, an image of the entire golf mat may be presented to the user by stitching the image of the extra region of interest RB to the right side of the image in the first region of interest R1. Also, referring to part (d) to part (f) of FIG. 6, the image of the entire golf mat may be presented to the user by stitching the image of the extra region of interest RB to the left side of the image in the second region of interest R2.

Figure 7:
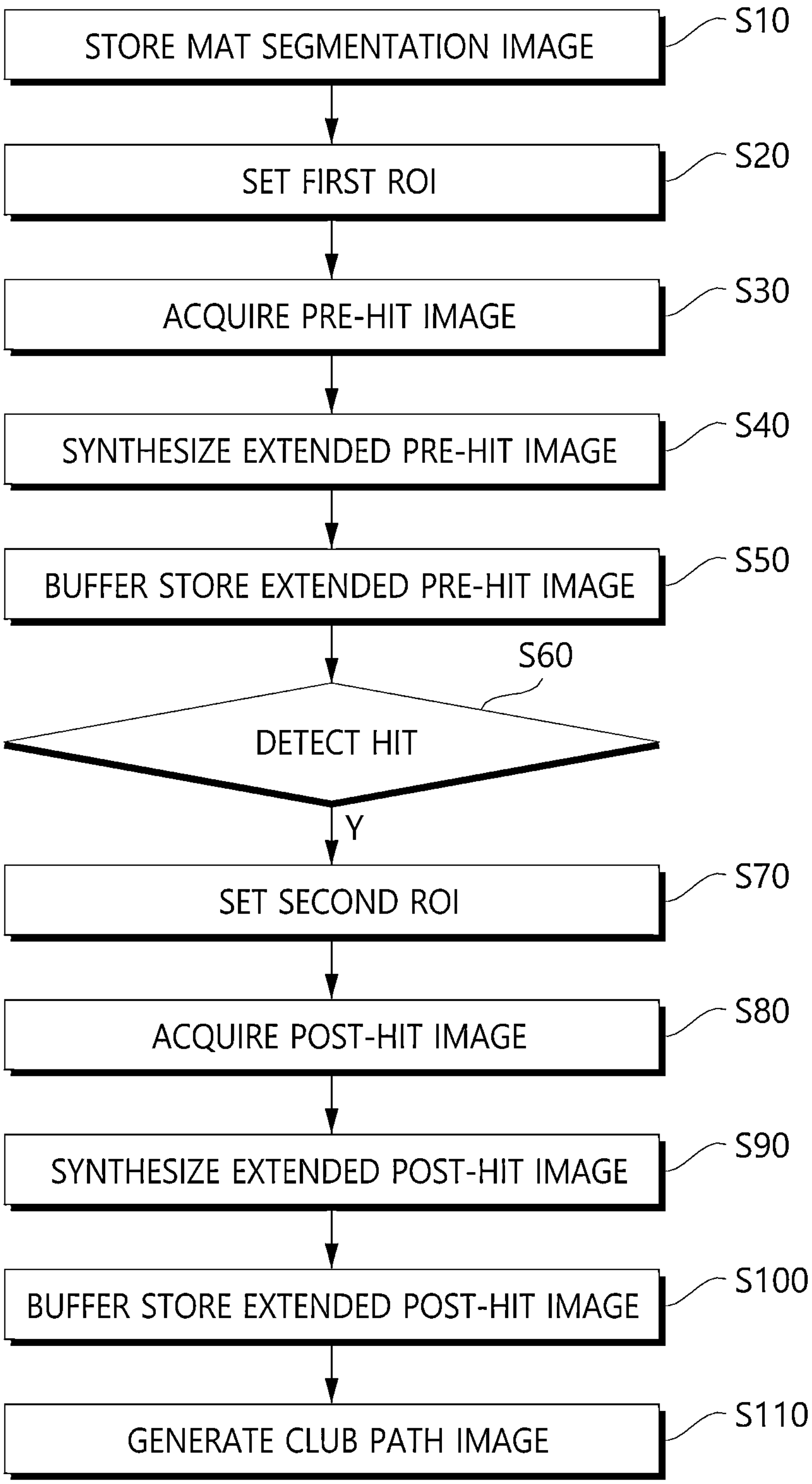
FIG. 7 is a flowchart illustrating a club path image providing method according to an exemplary embodiment of the present invention.

FIG. 7 is a flowchart illustrating a club path image providing method according to an exemplary embodiment of the present invention.

In a golf club path image, a mat segmentation image of at least a portion of a golf mat (e.g., an image of the previously described extra region of interest RB) is stored for utilization as an image of the golf mat on which a golf ball is not located (S10).

The operation S10 may be performed after the main control unit 110 has determined that the golf ball is placed on the golf mat and is in a complete ready state, or may be performed by using previously acquired images of the golf mat independent of the ready state.

When it is determined that the ready state in which the golf ball is placed on the golf mat and the golf ball is completely ready to be hit, the camera control unit 120 sets a region of interest of the first camera 22 to as a first region of interest R1 (S20).

The club path image generating unit 140 acquires an image before hit of the golf ball for the first region of interest R1 from the first camera 22 (S30).

The club path image generating unit 140 stitches the mat segmentation image to the image before the golf ball is hit for the first region of interest R1 to synthesize an extended pre-hit image in which the image before the golf ball is hit for the first region of interest R1 is extended along a movement direction of the golf club (S40).

The extended pre-hit image may be generated at a predetermined time interval, and the generated extended pre-hit image is stored in buffer memory of the image storing unit 144 (S50).

When the hit of the golf ball is detected from the image acquired by the camera sensor 20 (S60), the region of interest of the first camera 22 is set to a second region of interest R2 (S70).

The club path image generating unit 140 acquires an image after the golf ball is hit for the second region of interest R2 from the first camera 22 (S80).

The club path image generating unit 140 stitches the mat segmentation image to the image after the golf ball is hit for the second region of interest R2 to synthesize an extended post-hit image of the golf ball in which the image after the golf ball is hit for the second region of interest R2 is extended along the direction in which the golf club has been moving (S90).

The extended post-hit image may be generated at a predetermined time interval, and the generated extended post-hit image is buffer stored in the image storing unit 144 (S100).

The extended pre-hit image and the extended post-hit image are connected to generate a club path image as an image of the golf club hitting the golf ball (S110). The generated club path image may be provided to a user.

The club path image providing device 100 and the ball path calculating unit 160 of the virtual golf simulation system 10 described above may be implemented in software, or may be implemented in hardware. If the club path image providing device 100 and the ball path calculating unit 160 are implemented in software, the CPU may execute a computer program to perform various functions. The program may be stored in an embedded memory or on a non-transitory computer-readable recording medium. The club path image providing device 100 and the ball path calculating unit 160 may also be realized by so-called cloud computing by reading a program stored on an external recording medium. If the club path image providing device 100 and the ball path calculating unit 160 of the virtual golf simulation system 10 are implemented in hardware, the program may be realized by various circuits, such as ASICs, FPGAs or DRPs. In the present embodiment, various information or concepts including various information are described, but they are represented by a set of binary bits consisting of 0 or 1, which are represented by a high or low signal value, and communication or computation may be performed by any of the above software or hardware modalities.

Although the exemplary embodiment of the present disclosure has been described for illustrative purposes, those skilled in the art will appreciate that various modifications, additions and substitutions are possible, without departing from the essential characteristic of the invention. Therefore, the exemplary embodiments disclosed in the present disclosure and the accompanying drawings are not intended to limit the technical spirit of the present disclosure, but are intended to illustrate the scope of the technical idea of the present disclosure, and the scope of the present disclosure is not limited by the exemplary embodiment and the accompanying drawings. The scope of the present disclosure shall be construed on the basis of the accompanying claims in such a manner that all of the technical ideas included within the scope equivalent to the claims belong to the scope of the present disclosure.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A device for providing a club path image, the device comprising:

a camera control unit configured to control a camera sensor including a first camera, the first camera being configured to acquire image information of at least a portion of a golf mat;

an image acquiring unit configured to receive the image information acquired by the first camera; and a club path image generating unit configured to receive the image information from the image acquiring unit and generate a club path image representing a path of a golf club hitting a golf ball placed on the golf mat, wherein the camera control unit is configured to set a region of interest within a photographing region of the first camera to a first region of interest before the golf ball is hit by the golf club, and to change the region of interest from the first region of interest to a second region of interest after the golf ball is hit by the golf club, the second region of interest being different in position from the first region of interest, and wherein the club path image generating unit is configured to stitch a mat segmentation image information comprising image information for a partial region of the golf mat to image information for the first region of interest and image information for the second region of interest acquired by the first camera to extend each of the image information for the first region of interest and the image information for the second region of interest along a direction of movement of the golf club.

2. The device of claim 1, wherein the camera sensor further includes a second camera, and a region of interest of the second camera is set to the second region of interest before and after the golf ball is hit by the golf club.

3. The device of claim 2, further comprising:

a main control unit configured to control the camera control unit and the image acquiring unit, wherein the main control unit is configured to detect a hit of the golf ball based on image information from the second camera.

4. The device of claim 3, wherein the main control unit is configured to control the camera control unit to change the region of interest of the first camera from the first region of interest to the second region of interest when the hit of the golf ball is detected.

5. The device of claim 1, wherein the club path image generating unit is configured to extract the mat segmentation image information from a region of the golf mat included in the photographing region of the first camera, in which the golf ball is not located.

6. The device of claim 1, wherein the club path image generating unit includes:

an image processing unit configured to receive the image information of acquired by the first camera from the image acquiring unit and sequentially process the image information for the first region of interest and the image information for the second region of interest;

an image synthesizing unit configured to stitch the mat segmentation image information to the image information for the first region of interest and the image information for the second region of interest; and an image storing unit configured to temporarily store the image information from the image processing unit and the image synthesizing unit.

7. The device of claim 1, wherein the club path image generating unit is configured to stitch the mat segmentation image information to a first side of the image information for the first region of interest, and stitch the mat segmentation image information to a second side, opposite to the first side, of the image information for the second region of interest.

8. A device for providing a club path image, the device comprising:

a camera control unit configured to control a camera sensor including a first camera, the first camera being configured to acquire image information of at least a portion of a golf mat;

an image acquiring unit configured to receive the image information acquired by the first camera; and a club path image generating unit configured to receive the image information from the image acquiring unit and generate a club path image representing a path of a golf club hitting a golf ball placed on the golf mat, wherein when the golf club moves from a first side to a second side, the camera control unit is configured to set a first region of interest, such that the golf ball is positioned on the second side in the first region of interest, and a second region of interest is set such that the golf ball is positioned on the first side in the second region of interest.

9. A method of providing a path image of a golf club hitting a golf ball placed on a golf mat by a club path image generating device, based on image information of a photographing region acquired by a camera sensor including a first camera, the photographing region including at least a portion of the golf mat, the method comprising:

setting a region of interest of the first camera as a first region of interest within the photographing region;

acquiring, from the first camera, a pre-hit image of the golf ball in the first region of interest before the golf ball is hit by the golf club;

stitching a mat segmentation image of a segmented portion of the golf mat to the pre-hit image to synthesize an extended pre-hit image;

changing the region of interest of the first camera from the first region of interest to a second region of interest when a hit of the golf ball by the golf club is detected;

acquiring, from the first camera, a post-hit image in the second region of interest after the golf ball is hit by the golf club; and stitching the mat segmentation image to the post-hit image to synthesize an extended post-hit image.

10. The method of claim 9, wherein when the golf club moves from a first side to a second side, the first region of interest is set such that the golf ball is located on the second side in the first region of interest, and the second region of interest is set such that the golf ball is located on the first side in the second region of interest.

11. The method of claim 9, wherein the camera sensor further includes a second camera, and a region of interest of the second camera is set to the second region of interest before and after the golf ball is hit by the golf club.

12. The method of claim 9, wherein in the stitching the mat segmentation image to the pre-hit image, the mat segmentation image is stitched to a first side of the pre-hit image in the first region of interest, and wherein in the stitching the mat segmentation image to the post-hit image, the mat segmentation image is stitched to a second side, opposite to the first side, of the post-hit image in the second region of interest.

* * * * *